July 6, 1926.
W. L. CLOUSE
HEATING APPARATUS
Filed Sept. 1, 1923
1,591,468
2 Sheets-Sheet 2
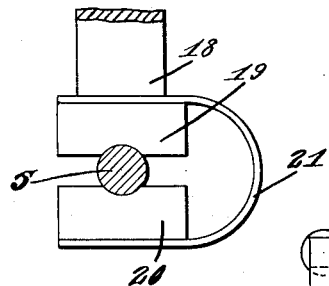
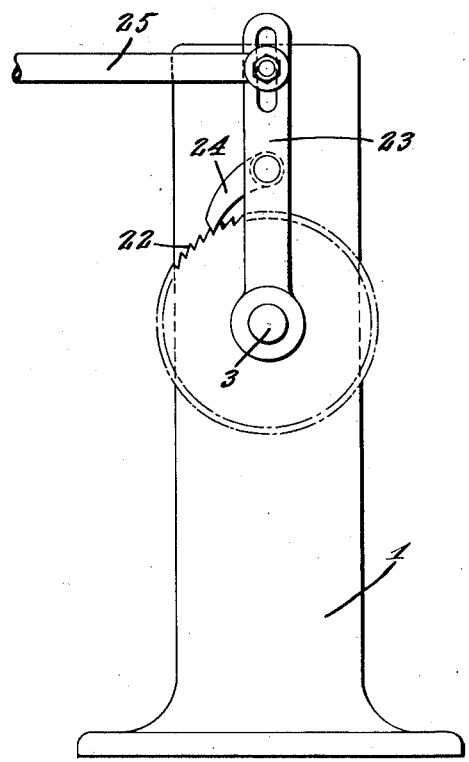
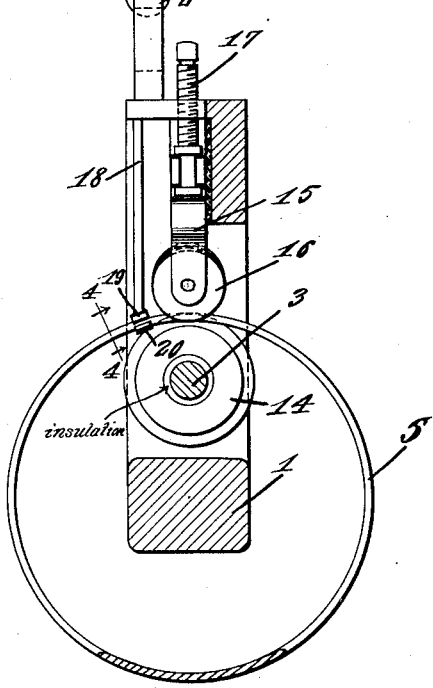
W. L. Clouse, Inventor Patented July 6, 1926.

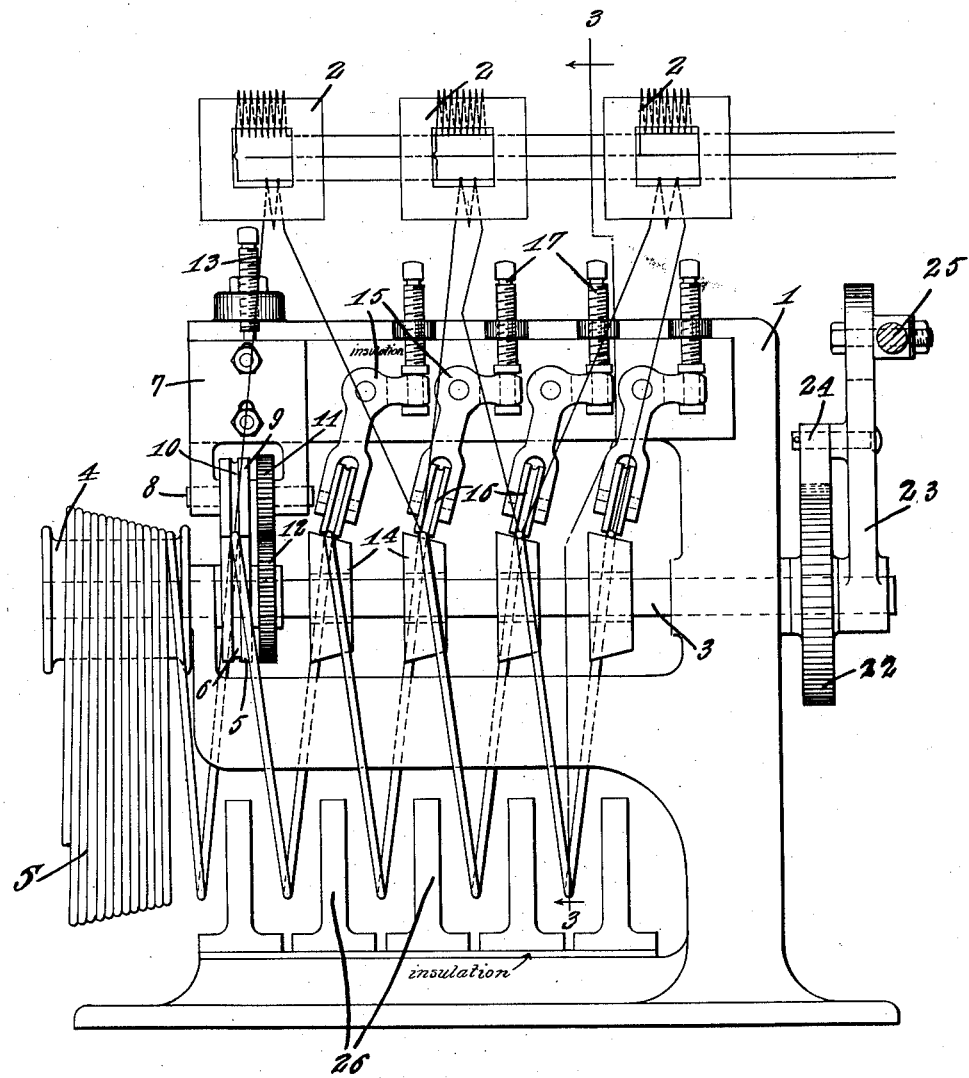

1,591,468

UNITED STATES PATENT OFFICE.

WILLIAM L. CLOUSE, OF TIFFIN, OHIO, ASSIGNOR TO NATIONAL MACHINERY COMPANY, OF TIFFIN, OHIO.

HEATING APPARATUS.

Application filed September 1, 1923. Serial No. 660,552.

This invention relates to apparatus designed primarily for heating long bars or rods of iron or steel such as used, for example, in the manufacture of bolts, rivets, nuts, springs, and the like.

Heretofore it has been quite a problem to heat material of this kind at a sufficiently high rate of speed to keep the finishing machine properly supplied. When coiled material, such as used in the manufacture of articles as above enumerated, is heated by passing it through a long furnace, the cost becomes excessive because of the large fuel consumption required in order to obtain the proper heat over the necessary length of material. Furnaces that are from twenty to thirty feet in length have been required. To avoid the objection present in apparatus utilizing long furnaces attempts have been made to heat coiled material electrically. It has been found, however, that in order to supply sufficient material to keep up with a bolt or rivet heading machine, it is necessary that from 40 to 80 feet of stock be heated per minute. If any effort is made to heat coiled stock at such a rate, then either the secondary leads from the transformer must be so far apart that the resistance of the secondary cuts down the efficiency of the transformer and necessitates raising the voltage to such a high point that excessive arcing develops at the contactors. On the other hand, if the contactors are located on the coil stock reasonably close together, such as a distance of 10 or 15 feet, then the rate of flow of current, in order to develop the required heat in the necessary length of time, makes it almost impossible to carry such a volume of current through the contactors without developing excessive heating of the contactors, arcing, etc. Consequently, the problem has been to provide an arrangement of parts which would enable a considerable length of coiled material to be heated without having the device cover an excessive floor space. Furthermore, some plan of transferring the current in the coiled stock was necessary in which the rate of flow of current through any one set of contactors would be sufficiently low so that the trouble from arcing would not develop.

One of the objects of the present invention is to overcome the problems that have been heretofore presented in electric heating apparatus of this type by moving the bar or other stock to be heated through a plurality of contactors connected with a number of secondary coils of one or more transformers so that the flow of current through any one pair of contactors will be sufficiently low to avoid arcing but still allow a sufficient amount of current to pass through the stock during a predetermined time interval to raise the temperature of the stock to the desired degree.

A further object is to feed the material across contactors from a succession of transformers whereby the heat in the material is built up in successive spaces by the succession of the transformers, thereby effecting a gradual heating without the necessity of the flow of such a current through the contactors as would arc or develop other difficulties.

A further object is to provide a mechanism that renders the operation of the heating mechanism synchronous with the mechanism of the machine to which the hot stock is supplied.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a view partly in elevation and partly in diagram of the complete apparatus constituting the present invention, the coiled material to be heated being shown in position therein.

Fig. 2 is an end elevation showing the means for intermittently feeding the material.

Fig. 3 is a section on line 3—3, Fig. 1.

Fig. 4 is an enlarged section on line 4—4, Fig. 3.

Referring to the figures by characters of reference 1 designates a frame supporting a bank of transformers 2, these transformers having been illustrated in diagram in Fig. 1. A shaft 3 is journaled in the frame and is provided at one end with a drum 4 adapted to support a coil of stock indicated at S.

Secured to shaft 3 near the drum 4 so as to rotate therewith is a roll 5 having an annular groove 6 in the periphery thereof. This wheel can be made of insulating material or, if preferred, can be insulated from the shaft 3. Secured to but insulated from the upper portion of the body 1 is a hanger 7 in which is mounted a shaft 8 carrying a wheel 9 that is provided with an annular groove 10 adapted to register with the groove 6. A gear 11 is carried by the shaft 8 and rotates with the wheel 9, this gear meshing with a gear 12 secured to and rotatable with the shaft 3. As shown particularly in Fig. 1 the hanger 7 is engaged at its upper end by a screw 13 which, when turned in one direction, will force the hanger downwardly and thus cause the wheel 9 to bind tightly on the stock extending between the two wheels 5 and 9.

Secured to but insulated from the shaft 3 are spaced supporting wheels 14. These wheels rotate with the shaft and are of any suitable contour. In the structure illustrated the wheels are frusto-conical and each one of these wheels is designed to support one convolution of the coiled stock as it passes from the drum 4 to the finishing machine, not shown.

Coöperating with each of the wheels 14 is a bell crank 15, these bell cranks being insulated from the body 1, and each of them carrying a grooved driving wheel 16 adapted to engage the stock supported by the wheel 14 thereunder.

One arm of each bell crank is engaged by an adjusting screw 17. Thus it will be seen that by rotating these screws the bell cranks can be adjusted angularly, thereby to move their wheels 16 transversely of the peripheries of the wheels 14 so as to bring the convolutions of the coiled stock farther apart or closer together as preferred.

Supported adjacent each of the wheels 5 and 14 is a contactor such as shown in detail in Fig. 4. This contactor includes a supporting hanger 18 provided with an upper contact block 19 and a lower contact block 20, the two blocks being connected by a spring 21. The coiled stock is designed to pass through these contactors, the two blocks 19 and 20 bearing against the stock as shown in Fig. 4.

The secondary coils of the transformers are electrically connected to the contactors as shown in diagram in Fig. 1, the secondary coil of the first transformer of the bank being electrically connected to the contactor adjacent wheel 5 and to the contactor adjacent the second wheel 14. This latter contactor is electrically connected to the secondary coil of the intermediate transformer and the same secondary coil is connected to the contactor of the next adjoining wheel 14. The secondary coil of the third transformer is electrically connected to the last named contactor and also to the contactor the farthest removed from the drum 4.

For the purpose of actuating this mechanism synchronously with the finishing machine a ratchet wheel 22 is secured to the shaft 3. A lever 23 is mounted to oscillate on the shaft 3 and carries a pawl 24 which engages the ratchet wheel. An operating arm 25 is pivotally and adjustably connected to the lever 23 and is adapted to be reciprocated by the mechanism of the finishing machine. Thus during each back and forth movement of the arm 25 the shaft 3 and the parts carried thereby will be given a limited rotation in one direction. This reciprocation of rod 25 will set up intermittent rotation of the shaft 3 in one direction.

For the purpose of keeping the convolutions of the wheel supported out of contact with each other, a series of guards 26 is located on the lower portion of the frame 1, these guards projecting between the convolutions as shown. The guards may be of insulating material or may be mounted on insulating material as shown. Obviously any other suitable means can be employed for holding apart the convolutions of the coiled stock and at the same time preventing arcing between the convolutions It will be obvious that with the structure described the intermittent rotation of the shaft 3 will result in the intermittent rotation of the coiled material to the finishing machine (not shown) that is coupled to this apparatus. When a current is directed to the transformers the current passing through the secondary coils will flow from the conductors 19 and 20 and around the adjacent loops of the coiled material to be heated. While in some instances two phase current is used (in which event the present apparatus would be constructed with two transformers) it is the usual practice to use a three phase current. Three transformers therefore are usually employed and the leads from the three secondaries are brought down to the various loops of the coil as indicated in diagram in Fig. 1. As is well known, the resistance of iron or steel to the flow of an electric current varies directly with its temperature. Consequently when the material is cold and the resistance is low, more current will pass through the material than after it becomes heated. By referring to Fig. 1 it will be noted that one transformer is connected to the first two spaced loops of the coiled material. Thus these loops become part of the secondary circuit and as the material is cold when fed into this portion of the apparatus, the increased length, resulting from the use of two loops, helps to retard or hold the flow of current to a reasonable amount. It is to be understood that the same results can of course be secured by varying the voltage of the primary coil of this particular transformer but the arrangement illustrated is preferred.

In the drawings the convolutions of the stock have been shown supported by frusto-conical wheels 14 and the adjustable grooved wheels 16 provide a means whereby the respective convolutions can be supported at any desired positions on the wheels 14. This construction and arrangement constitutes an important feature of the present invention, because it takes care of the expansion of the stock while being heated. It will be obvious that should all of the wheels 16 be set in the same positions relative to the respective wheels 14 so that all of the coils or loops of the stock would be of the same length, the increase in temperature as the stock moves over the wheels 14 would occasion such an expansion of stock that the successive loops would gradually increase in diameter.

By adjusting the wheels 16 so as to hold the engaged convolutions at different positions on the respective tapered or frusto-conical wheels 14 the speed of the successive loops can be varied so that the expansion of the stock due to the heating thereof will be offset and the convolutions will be maintained the same size.

While three transformers have been shown, it will be obvious that more than this number can be employed where necessary and in addition, two or more secondary coils can be led out from each transformer so that as many increments of heat can be applied as desired.

While the present arrangement shows an oscillating lever 23 whereby the present apparatus can be synchronized with a heading machine, it will be understood that any other means can be employed for this purpose. For example, certain types of machines would require a constant rotation of shaft 3. Accordingly, any suitable gearing or belting could be provided therefor. Such an arrangement is so obvious that illustration or description thereof is not deemed necessary.

Importance is attached to the fact that the stock is coiled at the time the current is passed through it, thereby providing a practical means of utilizing a considerable length of stock and still keeping the length of the leads from the secondary coils of the transformer extremely short. Another important feature is the electric heating of coiled stock by passing a current through it while looped. It is also considered to be of importance to extend the leads from the secondary transformer coils to the loops of the coiled stock, as this enables the heating of the material to be built up or increased gradually without requiring the contactors to carry such a flow of current as to develop arcing and other difficulties.

Although the stock has been shown and described as looped to form coils or convolutions, it is to be understood that the stock can, if desired, be arranged in loops occupying one or more parallel planes and the terms "loops" and "coils" as used in the appended claims are intended to cover any arrangement of looped or coiled stock whether or not in the form of convolutions such as illustrated.

What is claimed is:—

1. In apparatus of the class described, the combination with separate transformers and contactors connected to the leads of the secondary coils of the transformers, of separate spaced means for engaging separate convolutions of coiled stock and feeding the stock through the contactors, said means constituting means for compensating for expansion of the stock and maintaining a constant length of stock between the feeding means.

2. Apparatus for gradually raising the temperature of stock passing therethrough, including separate transformers, contactors connected to the leads of the secondary coils of the transformers, and separate spaced means for engaging convolutions of coiled stock to feed the stock through the contactors, each of said means including a tapered stock supporting wheel mounted for rotation and adjustable means for holding stock in engagement with a selected portion of the periphery of the tapered wheel.

3. Apparatus of the class described including separate heating units having, separate means for supporting separate convolutions of coiled stock in cooperative relation to said units, and means for actuating the supporting means for feeding stock to bring every portion thereof successively into engagement with the respective units thereby to step up the temperature of the stock.

In testimony that I claim the foregoing as my own, I have hereto affixed my signature.

WILLIAM L. CLOUSE.